US006717165B2

(12) United States Patent
Cha

(10) Patent No.: US 6,717,165 B2
(45) Date of Patent: Apr. 6, 2004

(54) DEVICE AND METHOD FOR DETECTING THE DRIVE STATE OF A TURBO PUMP IN A TANDETRON ACCELERATOR OF AN ION IMPLANTATION DEVICE

(75) Inventor: Kwang-Ho Cha, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 196 days.

(21) Appl. No.: 09/963,481

(22) Filed: Sep. 27, 2001

(65) Prior Publication Data

US 2002/0050577 A1 May 2, 2002

(30) Foreign Application Priority Data

Oct. 27, 2000 (KR) ........................................ 2000-63398

(51) Int. Cl.[7] ................................................ G02B 27/00
(52) U.S. Cl. .................. 250/551; 250/492.21; 417/44.1
(58) Field of Search ............................ 250/551, 492.21, 250/251, 289, 227.11; 417/44.1, 44.11

(56) References Cited

U.S. PATENT DOCUMENTS 4,866,436 A * 9/1989 Kordts et al. .......... 340/870.28
6,169,015 B1 * 1/2001 Fu-Kang ..................... 438/510

FOREIGN PATENT DOCUMENTS

KR 1997-014050 4/1997
KR 98-077081 A * 11/1998

* cited by examiner

*Primary Examiner*—Thanh X. Luu
(74) *Attorney, Agent, or Firm*—Volentine Francos, PLLC

(57) ABSTRACT

A technique is disclosed for detecting a turbo pump drive state in a tendetron accelerator that accelerates an ion beam to implant ions onto a semiconductor wafer. In particular the method of detecting a turbo pump driving state in the accelerator includes the steps of detecting a current applied to the turbo pump in the accelerator; converting the detected current to an optical signal to transmit it through an optical fiber; converting the optical signal transmitted through the optical fiber to an electric signal; displaying the current value of the converted electric signal; comparing the current value of the converted electric signal with a setting current value to generate an interlocking signal when the current value is out of a given range of the setting current value; and cutting off a power supply of the tendetron accelerator in accordance with the interlocking signal.

5 Claims, 2 Drawing Sheets

DEVICE AND METHOD FOR DETECTING THE DRIVE STATE OF A TURBO PUMP IN A TANDETRON ACCELERATOR OF AN ION IMPLANTATION DEVICE

This application relies for priority upon Korean Patent Application No. 2000-63398, filed on Oct. 27, 2000, the contents of which are herein incorporated by reference in their entirety.

BACKGROUND OF THE INVENTION

The present invention relates to a device and method for detecting a turbo pump driving state in a tandetron accelerator of an ion implantation device. More particularly, the present invention relates to a device for detecting a driving state of a turbo pump for forming a vacuum state in an accelerator, by which an ion beam is accelerated to implant ions onto a semiconductor wafer. The present invention also relates to a method of operating such a device.

Generally, ion implantation into a wafer is performed under a condition in which an electrically charged atom has a sufficiently large amount of energy to penetrate through the surface of a non-conductive wafer. A tandetron accelerator that accelerates an ion beam includes inside of it a turbo pump for circulating argon gas (Ar) within. The tandetron accelerator is supplied with a high voltage of 650 KV at the stripper portion where the turbo pump is mounted, and the power driving the turbo pump is generally 30V. As a result, the practical externally-supplied voltage is 650 KV+30V. Accordingly, the corresponding power could not be both easily and sufficiently supplied externally while still maintaining a sufficient insulating state of the accelerator.

FIG. 1 is a diagram showing the structure of a conventional device for detecting a turbo pump driving state of a tandetron accelerator by which a sufficient insulating state is maintained.

The device for detecting the turbo pump driving state of a semiconductor ion implantation device according to a prior art includes a motor 10, a first pulley 12, a belt 14, a second pulley 16, a shaft 18, a generator 20, a first cable 22, a turbo pump 24, a plurality of beam lines 26, a stripper 28, a second cable 30, a current detecting part 32, and a current displaying part 34.

The first pulley 12 is attached to the rotation axis of the motor 10. The second pulley 16 is attached to the shaft 18, which is mounted on the rotation axis of the generator 20. The belt 14 is connected between the first and second pulleys 12 and 16 to transfer the rotation power of the motor 10 to the shaft 18, to drive the generator 20. The generator 20 generates a three-phase alternating current, which is sent through the first cable 22 to drive the turbo pump 24. The turbo pump 24, in turn, forms a high vacuum environment during an ion implantation process. The stripper 28 is disposed at the center of beam lines 26 and operates to circulate argon gas lest the gas flow out of the beam line 26. That is, the stripper 28 prevent gas from flowing out of the beam line 26. The second cable 30 supplies the driving power of the motor 10 to the current detecting part 32, which measures a current being supplied to the motor 10. This current is then displayed on the current displaying part 34.

When the motor 10 starts to rotate in response to an externally-input motor driving signal, the first pulley 12 also rotates. The rotating power of the first pulley 12 is then transferred to the shaft 18 attached to the rotating axis of the generator 20 through the belt 14 and the second pulley 16. As a result, the generator 20 begins to generate a 3-phase current power to supply to the turbo pump 24.

At this time, an ion beam proceeds from the right side to the left side of the beam line 26 and is changed from its originally charged state to a positively charged state through a charge-converting procedure. When the ions are radiated through an inlet and collide with argon gas while passing through the stripper 28, the ions lose their electrons and are charged to become positive ions. Afterwards, the positive ions flow out of an outlet of the stripper 28 opposite the inlet.

The turbo pump 24 maintains a high vacuum state to prevent the argon gas from flowing out of the stripper 28. In this high vacuum state, the current detecting part 32 connected to the second cable 30 measures the current of the motor 10 and provides it to the current displaying part 34 so that it can be displayed. A user can then confirm the current value displayed on the current displaying part 34 to check whether the turbo pump 24 in the tendetron accelerator is operating normally.

In order to maintain a stable state of the high voltage supplied to the tandetron accelerator, $SF_6$ gas having an insulating characteristic fills the inner side of the accelerator at a high pressure of 85 psi. Accordingly, when any inner device of the tandetron accelerator fails, it takes about 10 hours to first discharge and later refill the device with this gas in order to repair the device.

However, the conventional device cannot exactly detect the turbo pump driving state of the tandetron accelerator just by measuring the current value being supplying to the motor 10. As a result, even if the current supplied to the motor 10 is optimal, the turbo pump 24 may not be operated normally, and so argon gas may not be smoothly circulated, thereby causing a change in a charge-converting rate, which can result in a severe process failure.

Korean patent application No. 97-014050 discloses a current measuring device for measuring the current of a turbo pump in accelerator of an ion implantation apparatus in order to solve such a problem. In this Korean Patent application, a current supplied to a turbo pump by a power source is detected and displayed on a current indicator. An interlocking operation is then performed if the turbo pump fails.

However, to do this, electric wires must be laid between the current indicator installed outside of a tandetron tank and the current detecting part installed inside the tandetron tank in order to detect a current supplied to the turbo pump and then display such a current on the current indicator. As a result, an electrically insulation state cannot be maintained between the tandetron tank and the outside.

SUMMARY OF THE INVENTION

Accordingly, it is an object of the present invention to provide a device for detecting a turbo pump driving state in a tandetron accelerator by detecting a driving current of the turbo pump in the accelerator. It is also an object of the present invention to provide a method for operating such a device.

Another object of the present invention is to provide a turbo pump driving state detecting device in a tandetron accelerator by which a driving current of a turbo pump in a tendetron accelerator of an ion implantation device is detected and displayed outside of the tendetron accelerator while maintaining the tendetron's insulating state. It is also an object of the present invention to provide a method accomplishing this.

Still another object is to provide a turbo pump driving state detecting device and related method by which a turbo pump driving current is detected and a power supply of an accelerator is cut off when the detected current value is outside of a set range.

In order to accomplish the above objects, a device for detecting a turbo pump drive state in a tandetron accelerator of a semiconductor ion implantation device according to the present invention comprises a turbo pump formed inside of the accelerator; a current detecting part formed inside of the accelerator for detecting a turbo pump driving current applied to the turbo pump, and providing a first electrical signal indicative of the detected turbo pump driving current; an electro-optical converter formed inside of the accelerator for converting the first electrical signal to an optical signal; a photoelectric converter formed outside of the accelerator for converting the optical signal to a second electric signal; an optical cable formed between the electro-optical converter and the photoelectric converter for carrying the optical signal out of the accelerator; and a displaying part formed outside of the accelerator for receiving the second electric signal and displaying the turbo pump driving current contained in the second electric signal.

The device for detecting a turbo pump drive state may further comprise an interlock generator formed outside of the accelerator for comparing the second electric signal with a set current range, and generating an interlock signal when the second electric signal is out of the set current range.

The device for detecting a turbo pump drive state may further comprise an accelerator power supply formed outside of the accelerator for providing power to the accelerator. The accelerator power supply preferably receives the interlock signal generated from the interlock generator, and the accelerator power supply preferably stops providing power to the accelerator when it receives the interlock signal.

The device for detecting a turbo pump drive state may further comprise a generator formed inside of the accelerator for generator drive power; and an electrical cable for supplying the drive power to the turbo pump. The current detecting part is preferably electrically connected to the electrical cable.

The device for detecting a turbo pump drive state may further comprise a stripper formed inside the accelerator, wherein the current detecting part and the electro-optical converter are assembled on a board and disposed in the stripper, thereby preventing dielectric breakdown.

The optical cable preferably maintains an electric insulating state between a ground of the tandetron accelerator and a high voltage of the stripper.

A method of detecting a turbo pump driving state in a tandetron accelerator of a semiconductor ion implantation device is also provided. This method includes detecting a current applied to a turbo pump in the tandetron accelerator; outputting the detected current as an optical signal; transmitting the optical signal through an optical fiber that passes from inside of the accelerator to outside of the accelerator; converting the optical signal transmitted through the optical fiber to an external electric signal; and displaying a current value of the external electric signal.

After detecting the current applied to a turbo pump, the method may further comprise generating an internal electrical signal indicative of the detected current. The outputting of the detected current as an optical signal may be performed by converting the internal electrical signal to the optical signal.

The method of detecting a turbo pump driving state may further comprise comparing the current value of the external electrical signal with a set current value range; and cutting off a power supply of the accelerator when the current value of the external electrical signal is out of the set current value range.

The method of detecting a turbo pump driving state may further comprise generating an interlocking signal when the current value of the external electrical signal is out of the set current value range.

BRIEF DESCRIPTION OF THE DRAWINGS

The above and other objects and advantages of the present invention will become readily apparent from the description that follows, with reference to the accompanying drawings, in which.

DETAILED DESCRIPTION OF THE PREFERRED EMBODIMENTS

A preferred embodiment of the present invention will be explained below with reference to the accompanying drawings.

Figure 1:
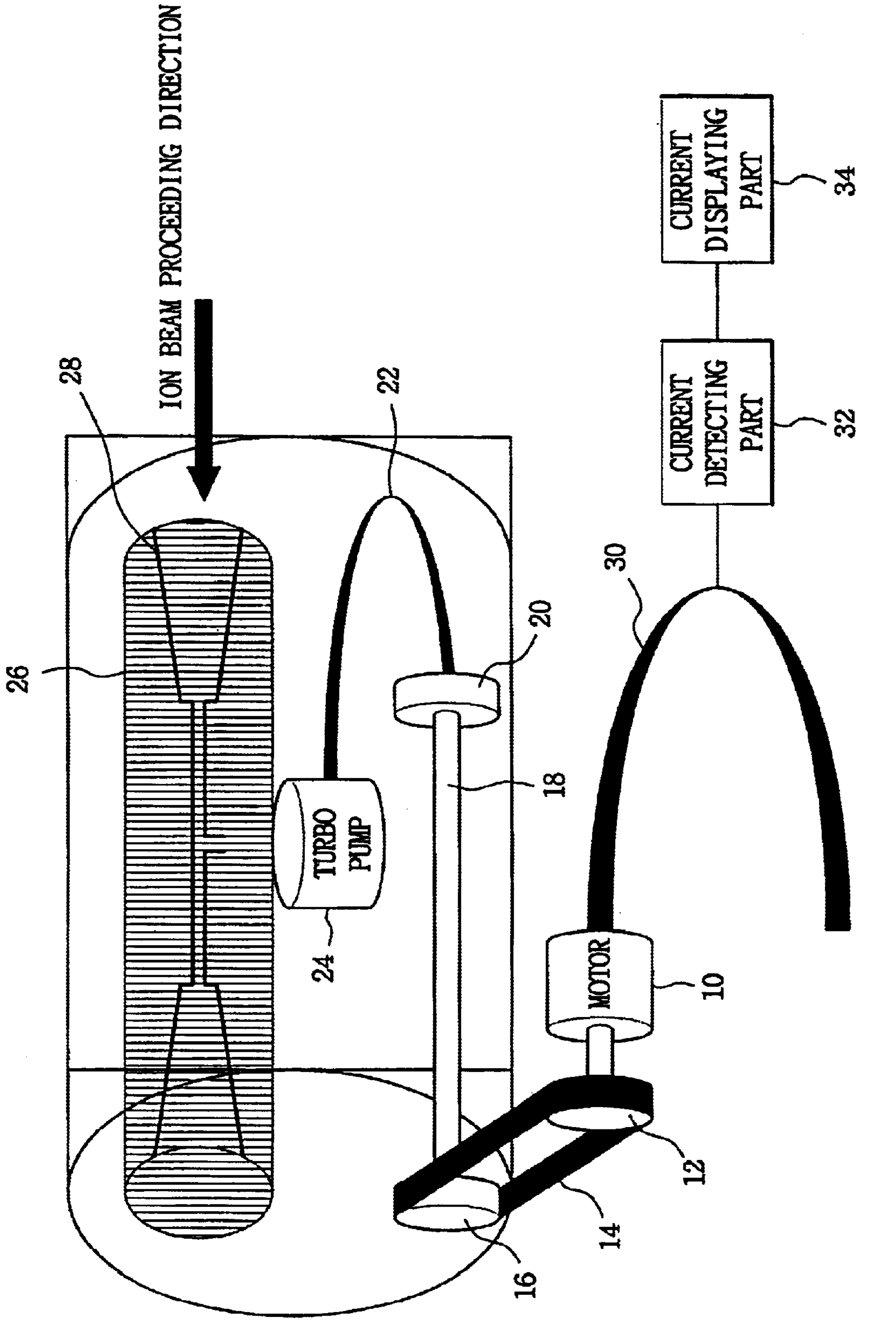
FIG. 1(PRIOR ART)
FIG. 1 is a diagram showing the structure of a device for detecting a turbo pump drive state of a conventional semiconductor ion implantation device.
Figure 2:
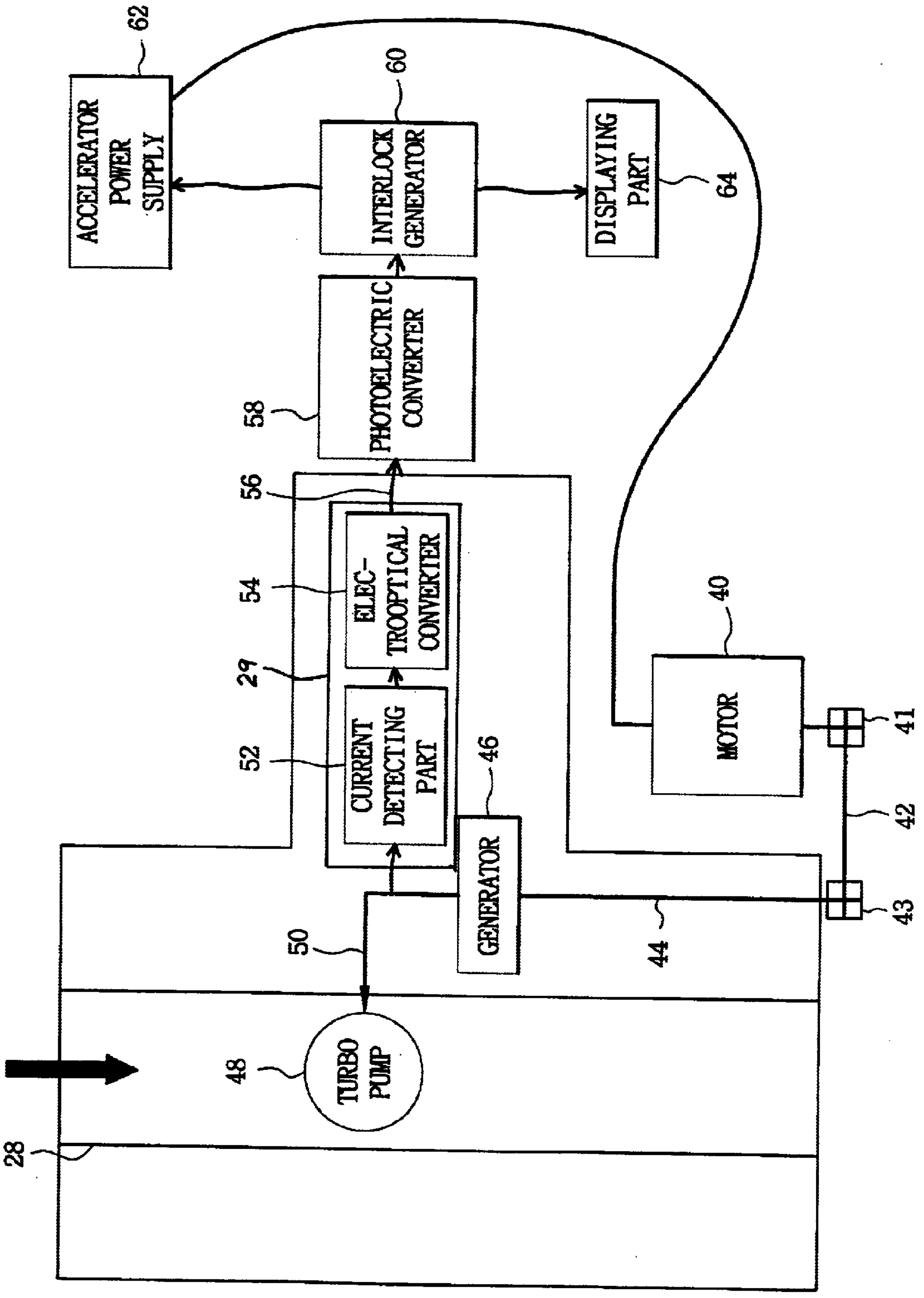
FIG. 2 is a diagram showing the structure of a device for detecting a turbo pump drive state in a tandetron accelerator according to a preferred embodiment of the present invention.

FIG. 2 is a diagram showing a device for detecting a turbo pump drive state in a tandetron accelerator according to a preferred embodiment of the present invention.

The turbo pump drive state-detecting device in a tandetron accelerator of a semiconductor ion implantation device according to the preferred embodiment of the present invention includes a motor 40, a first pulley 41, a belt 42, a second pulley 43, a shaft 44, a generator 46, a turbo pump 48, a cable 50, a current detecting part 52, an electro-optical converter 54, an optic fiber 56, a photoelectric converter 58, an interlock generator 60, an accelerator power supply 62, and a displaying part 64.

The first pulley 41 is attached to the rotation axis of the motor 40. The second pulley 43 is attached to the shaft 44, which is mounted on the rotation axis of the generator 46. The belt 42 is connected between the first and second pulleys 41 and 43 to transfer the rotation power of the motor 40 to the shaft 44, to drive the generator 46. The generator 46 generates a three-phase alternating current, which is sent through the cable 50 to drive the turbo pump 48. The turbo pump 48, in turn, forms a high vacuum environment during an ion implantation process.

The current detecting part 52 is connected to the cable 50 that supplies the drive power of the turbo pump 48, to detect the current applied to the turbo pump 48 in the tandetron accelerator and output an electrical signal indicating the value of the detected current. The electro-optical converter 54 converts the detected current from an electrical signal to an optical signal, which is transmitted over the optic fiber 56. The photoelectric converter 58 receives the optical signal transmitted through the optic fiber 56, and converts it back to an electrical signal.

The interlock generator 60 receives the electric signal converted by the photoelectric converter 58 and compares it with a set current value. The interlock generator 60 generates an interlocking signal when the signal is out of the range of the set current value range. Based on this determination, the accelerator power supply 62 cuts off a power supply in response to the interlocking signal generated by the interlock generator 60. The displaying part 64 displays the drive current of the turbo pump 48 output from the interlock generator 60 for the user to see.

The current detecting part 52 and the electro-optical converter 54 are preferably assembled in a board and should be installed at a stripper to maintain an insulating state because a high voltage is applied. That is, the current detecting part 52 and the electro-optical converter 54 are formed inside of the accelerator.

When the motor 40 rotates in response to the externally provided motor drive signal, the first pulley 41 also rotates. When the first pulley 41 rotates, the shaft 44 mounted at a rotational axis of the generator 46 receives a rotational power through the belt 42 and the second pulley 43. As a result of this, the shaft 44 rotates and the generator 46 is operated. The generator 46 preferably generates a three-phase current power, which it supplies to the turbo pump 48 through the cable 50.

The current detecting part 52 and the electro-optical converter 54 are preferably assembled in a board 29 and should be installed at a stripper 28 to maintain an insulating state because a high voltage is applied. That is, the current detecting part 52 and the electro-optical converter 54 are formed insided of the accelerator.

The electro-optical converter 54 converts the current detected by the current detecting part 52 to a digital optical signal (i.e., a frequency) and then transmits the digital optical signal to the outside of the tandetron accelerator through the optical cable 56. The optical signal carried on the optical cable 56 is then input to the photoelectric converter 58. The photoelectric converter 58 converts the optical signal to an electric signal, which it outputs it to the interlock generator 60.

In this design, the signal from the current detecting part 52 is transmitted by the optical cable 56, thereby maintaining an electrically insulating state between the ground voltage of the tandetron accelerator which is supplied with a high voltage and the stripper which also supplied with a high voltage.

The interlock generator 60 receives the converted electric signal and displays it on the displaying part 64. In addition, the interlock generator 60 also compares the converted signal with a set current value range to generate an interlocking signal when the detected current is out of the set range.

The interlock generator 60 allows the converted electric signal, i.e., the signal indicating the current supplied to the turbo pump 48, to be displayed on the displaying part 64. However, in alternate embodiments, it is possible to display the electric signal on the displaying part 64 without using the interlock generator 60, by forwarding the converted electrical signal directly to the displaying part 64 from the photoelectric converter 58.

The interlock signal is preferably applied to the power supply 62 of the accelerator to turn off the power to the accelerator.

As described above, the present invention has an advantage in that the current for driving the turbo pump is detected and displayed to allow a user to personally confirm it. In addition, the detected current is compared with a set value to allow a the system to determine whether the turbo pump has failed or not, allowing the system to cut off the power supply to the tandetron accelerator when it fails.

In addition, there is an advantage that the detected turbo pump driving current is transmitted between the inner side and outside of the tandetron accelerator by an optical cable so that an electric insulating state is maintained between the ground voltage of the tandetron body and the high voltage on the stripper portion.

The present invention has been described by way of a specific exemplary embodiment, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation ad illustrated and described. Hence, all suitable modifications and equivalents may be resorted to as falling within the scope of the invention.

What is claimed is:

1. A device for detecting a turbo pump drive state in a tandetron accelerator of a semiconductor ion implantation device, comprising:

a turbo pump formed inside of the accelerator;

a stripper formed inside the accelerator, a current detecting part formed inside of the accelerator for detecting a turbo pump driving current applied to the turbo pump, and providing a first electrical signal indicative of the detected turbo pump driving current;

an electro-optical converter formed inside of the accelerator for converting the first electrical signal to an optical signal;

a photoelectric converter formed outside of the accelerator for converting the optical signal to a second electric signal;

an optical cable formed between the electra-optical converter and the photoelectric converter for carrying the optical signal out of the accelerator; and a displaying part formed outside of the accelerator for receiving the second electric signal and displaying the turbo pump driving current contained in the second electric signals, wherein the current detecting part and the electra-optical converter are assembled on a board and disposed in the stripper, thereby preventing dielectric breakdown.

2. The device for detecting a turbo pump drive state as recited in claim 1, further comprising an interlock generator formed outside of the accelerator for comparing the second electric signal with a set current range, and generating an interlock signal when the second electric signal is out of the set current range.

3. The device for detecting a turbo pump drive state as recited in claim 2, further comprising an accelerator power supply formed outside of the accelerator for providing power to the accelerator, wherein the accelerator power supply receives the interlock signal generated from the interlock generator, and wherein the accelerator power supply stops providing power to the accelerator when it receives the interlock signal.

4. The device for detecting a turbo pump drive state as recited in claim 1, further comprising:

a generator formed inside of the accelerator for generator drive power; and an electrical cable for supplying the drive power to the turbo pump, wherein the current detecting part is electrically connected to the electrical cable.

5. The device for detecting a turbo pump drive state as recited in claim 1, wherein the optical cable maintains an electric insulating state between a ground of the tendetron accelerator and a high voltage of the stripper.

* * * * *